United States Patent [19]

Levien

[11] Patent Number: 5,524,162
[45] Date of Patent: Jun. 4, 1996

[54] METHOD AND APPARATUS FOR ADAPTIVE SHARPENING OF IMAGES

[76] Inventor: Raphael L. Levien, Rte. 1, Box 18, P.O. Box 31 (UPS), McDowell, Va. 24458

[21] Appl. No.: 733,479

[22] Filed: Jul. 22, 1991

[51] Int. Cl.⁶ .................................................. G06K 9/40
[52] U.S. Cl. .................................................. 382/263
[58] Field of Search .......................... 382/54, 43, 254, 382/263, 280; 358/447; 364/724.05, 724.06, 724.08, 724.19

[56] References Cited

U.S. PATENT DOCUMENTS

| | | | |
|---|---|---|---|
| 4,053,934 | 10/1977 | Kornreich et al. | 382/43 |
| 4,319,268 | 3/1982 | Yamada | 358/80 |
| 4,703,349 | 10/1987 | Bernstein | 382/43 |
| 4,747,052 | 5/1988 | Hishinuma et al. | 358/447 |
| 4,794,531 | 12/1988 | Morishita et al. | 382/54 |
| 5,001,573 | 3/1991 | Sakamoto et al. | 358/447 |
| 5,038,388 | 8/1991 | Song | 382/54 |

*Primary Examiner*—Joseph Mancuso

[57] ABSTRACT

A method and apparatus for adaptively sharpening an image includes dividing the image area into smaller sub-areas each containing a sub-image, and adaptively sharpening each sub-area image individually. That is, the sharpening factor SF, and the blur area are automatically and adaptively set differently for each individual sub-area image of the original photograph. The sharpening effect is thus improved over the entire image area since each sub-area image of the original image is sharpened in accordance with the amount of sharpening needed. Areas with more detail needing more sharpening, would receive more sharpening, while other areas such as gray sky, receive almost no sharpening.

12 Claims, 4 Drawing Sheets

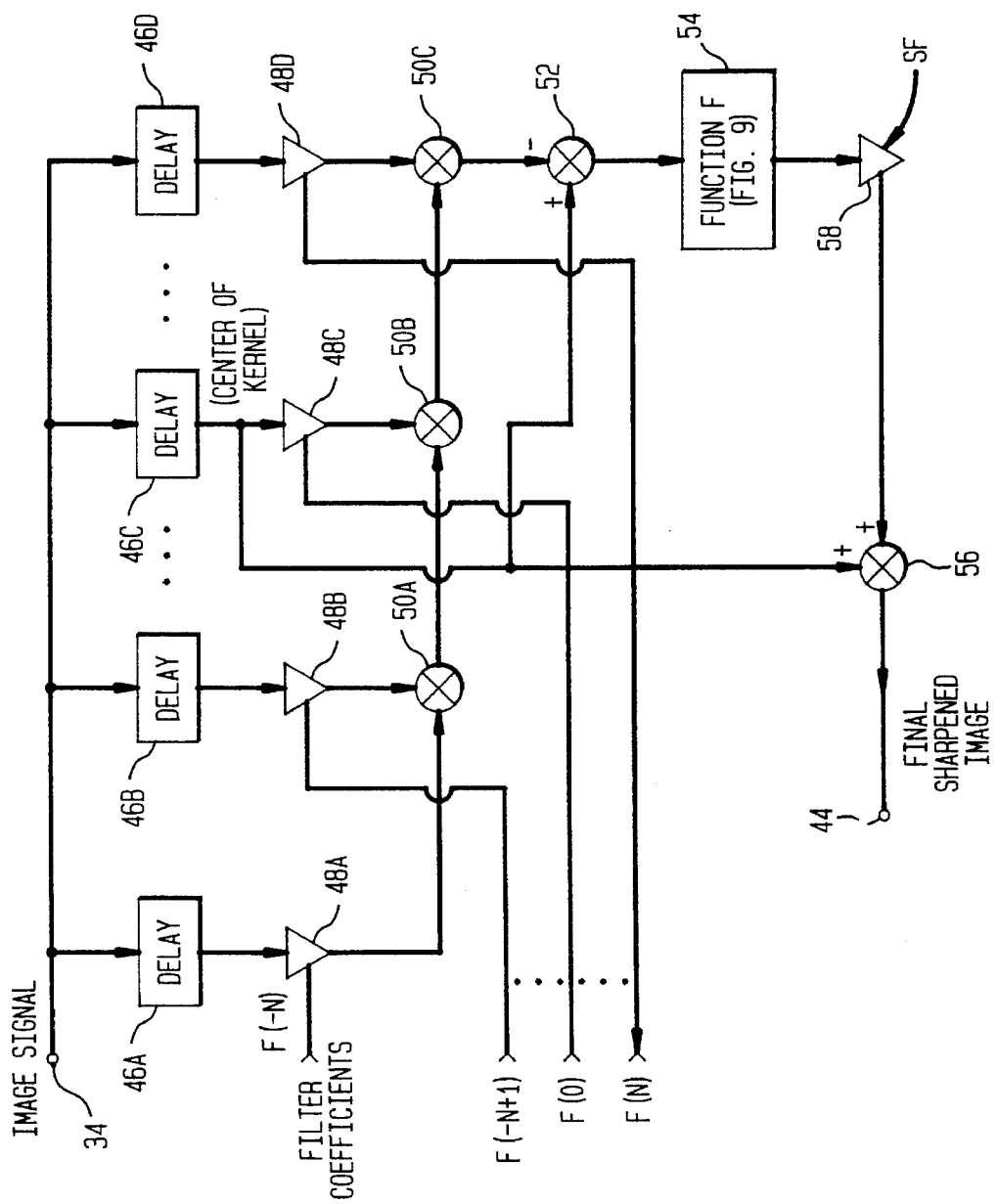

METHOD AND APPARATUS FOR ADAPTIVE SHARPENING OF IMAGES

FIELD OF THE INVENTION

The present invention relates to the field of image processing, and particularly the present invention relates to a method and apparatus for sharpening an image.

BACKGROUND OF THE INVENTION

An image may be represented in a memory as an array of stored pixels. Techniques for image sharpening are well known. The sharpness of the image is a measure of the high frequency content of a line scanned video signal representing a video scan line through the image. Sharper images have generally larger changes in intensity from one pixel to another, and therefore tend to have higher frequency content. Conversely, less sharp or blurry images have generally smaller changes in intensity from one pixel to another, and therefore tend to have less higher frequency content.

As is known to those skilled in the art, an image may be sharpened by creating a blurred (unsharp) image from the original image, and then subtracting the unsharp image from the original image to create a difference image. The difference image is then scaled (multiplied) by a sharpening factor, SF, a selected parameter of the sharpening process. The original image is combined with the scaled difference image to form a sharpened image. Thus, final=original+SF*(original-unsharp)

The problem in the prior art is that the two factors which control sharpening, i.e. the sharpening factor SF, and the amount of blurring are typically adjusted by an operator. More blurring will result in a more pronounced sharpening effect. Less blurring works better on images which are already somewhat sharp and therefore need less sharpening.

A more subtle problem exists in some images where the sharpness of the image varies within the same photograph. Uneven sharpness can result from motion blur where a moving object (or a moving background) has a difference in sharpness. Also, photographs taken with limited depth of field have areas with different sharpness. In some photographs the effect of finite depth of field is very pronounced, but it exists to some extent in almost every photograph. Too much sharpening produces a grainy effect in some areas (such as gray sky), while not enough sharpening leaves some areas (such as faces) blurry.

SUMMARY OF THE INVENTION

The present invention is embodied in a method and apparatus for adaptively sharpening an image. In accordance with the present invention, a method and apparatus is provided for sharpening an image by dividing the image area into smaller sub-areas each containing a sub-area image, and adaptively sharpening each sub-area image individually. That is, the sharpening factor SF, and the blur area would be set differently for individual sub-area images of the original photograph. The sharpening effect is thus improved over the entire image area since each sub-area image of the original image is sharpened in accordance with the amount of sharpening needed. For example, faces could receive more sharpening while areas of gray sky would receive almost no sharpening.

In accordance with a further aspect of the present invention, the image sharpening parameters for each sub-area image are automatically set by processing the original sub-area image. Thus, sharpening each of the sub-area images of the original image does not require individual operator adjustment.

Specifically, to automatically sharpen a stored image, the maximum frequency (FMAX) of the image energy content of each sub-area image is first determined. The fast Fourier transform (FFT), a well known technique for analyzing the frequency content of signals, is suitable for determining FMAX. Values for SF and filter coefficients for blur are derived from FMAX. It is desired to increase the energy at frequencies between 0.5 FMAX and FMAX of the original image signal in order to increase the sharpness of the image.

The sharpening apparatus suitable for use with the present invention includes a finite impulse response (FIR) digital filter to provide a blurred sub-area image, and means for subtracting the blurred sub-area image from the original sub-area image to provide a difference sub-area image, means for scaling the difference sub-area image by the sharpening factor, SF, and combining the scaled sub-area difference image with the original sub-area image to produce a sharpened sub-area image. The coefficients for the FIR digital filter are determined from the FFT calculation of FMAX, as is the sharpening factor SF. Coefficient values and SF are selected to increase the relative energies of the sharpened sub-area image at the frequencies 0.5 FMAX to FMAX of the original sub-area image.

DESCRIPTION OF THE FIGURES

FIG. 8 is an image sharpening apparatus for use in conjunction with the present invention.

DETAILED DESCRIPTION

Figure 1:
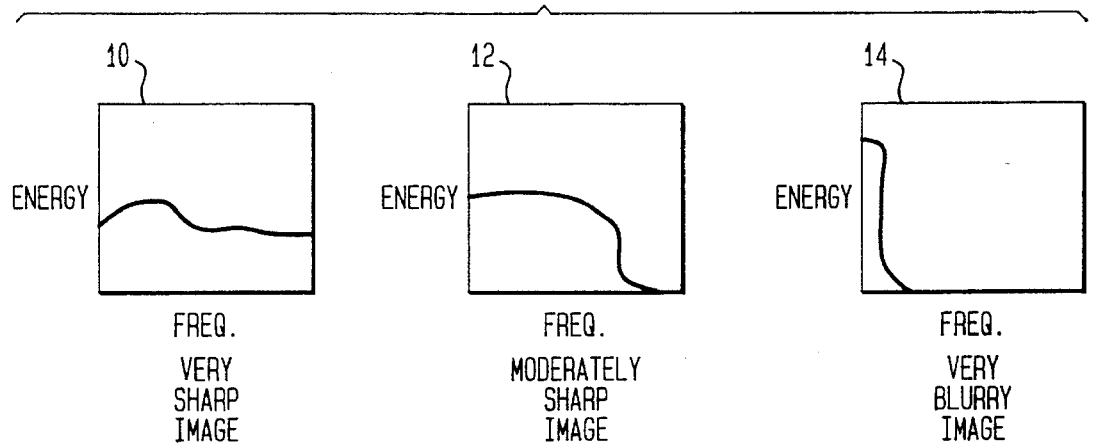
FIG. 1 shows energy distribution curves in the frequency domain for various types of images.

The energy distribution of typical sharp and blurry images is shown in FIG. 1. Specifically, a very sharp image will tend to have energy in all frequency bands 10, while a very blurry image will have most of its energy in the very low frequencies and almost no energy in the higher frequency bands 14. A moderately sharp image will have energy in the lower to middle frequency bands, but will lack energy in the highest frequency bands.

Figure 2:
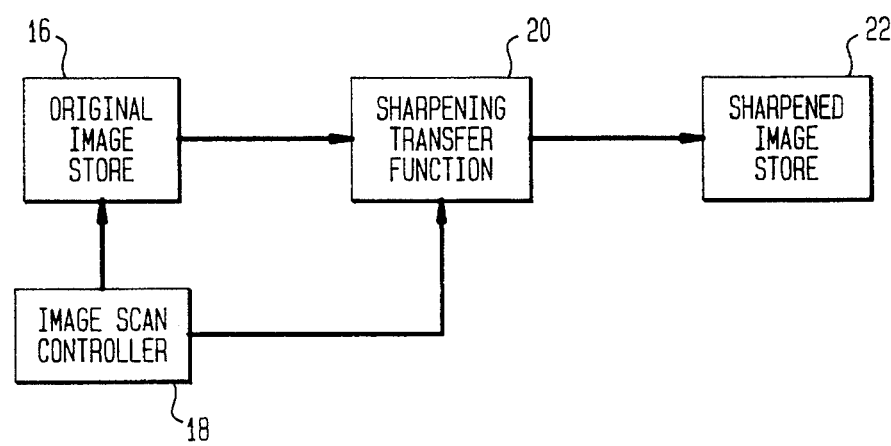
FIG. 2 is a block diagram of an adaptive image sharpening system in accordance with the present invention.

A block diagram of an adaptive image sharpening system is shown in FIG. 2. The original image to be sharpened is stored in a memory 16. Under the control of an image scan controller 18, the original image is processed through a sharpening transfer function 20 to provide a sharpened image for storage 22.

Figure 4:
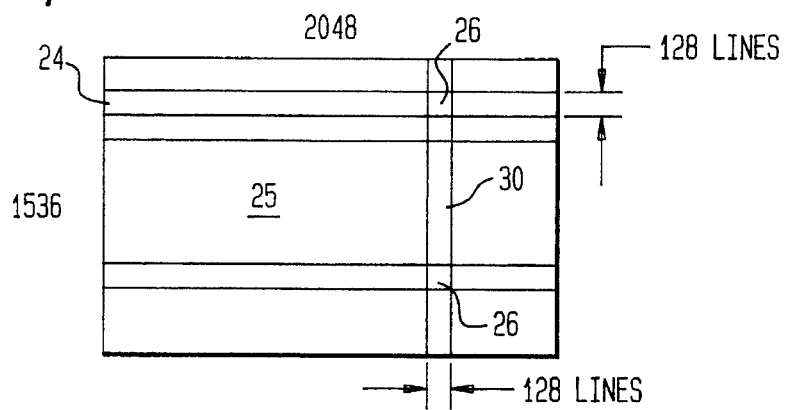
FIG. 4 shows the manner in which an original image area is scanned to divide the image area into a plurality of sub-area images.

As illustrated in FIG. 4, the present adaptive sharpening system processes an image area 25 as a plurality of sub-areas 26. An original image of 2048 by 1536 pixels is scanned along each horizontal line 24. The horizontal image scan signal is divided into groups of 128 pixels and processed to adaptively sharpen each individual group of 128 pixels. Similarly, the original image is scanned along each vertical line 30. The vertical image scan signal is divided into groups of 128 pixels and processed to adaptively sharpen each individual group of 128 pixels. The sub-area 26 of the original image area is thus adaptively sharpened according to the amount of sharpening needed for the image in sub-area 26. In such manner, each sub-area of the original image is individually and adaptively sharpened. While sub-areas of 128 by 128 pixels are shown, any other sub-area size such a 32 by 32 pixels or other non rectangular sub-area sizes may be used. Sub-area image size may be selected to optimize the adaptive sharpening process.

Figure 5A:
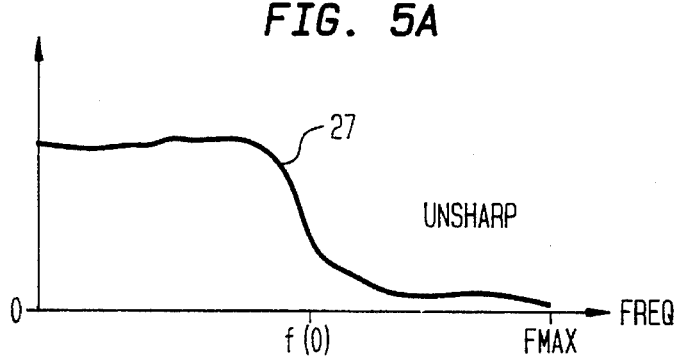
FIG. 5A is a frequency response of a blurring filter used in accordance with the present invention.
Figure 5B:
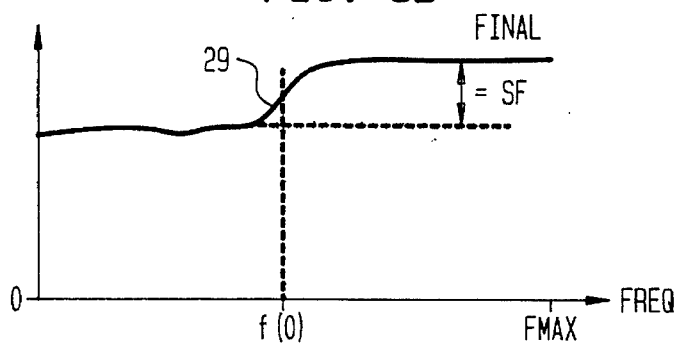
FIG. 5B is the resulting frequency response of the sharpening filter used in accordance with the present invention.
Figure 6:
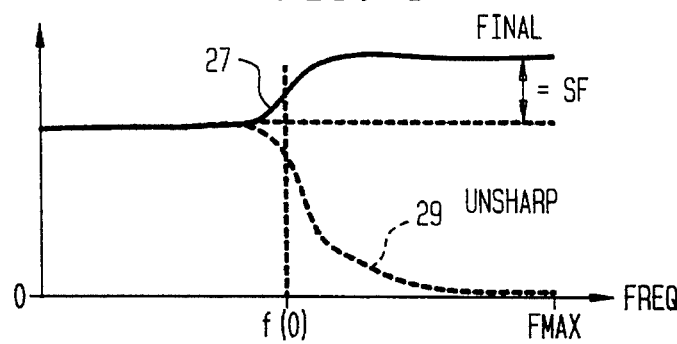
FIG. 6 shows the frequency response of the blurring and sharpening filters from FIGS. 5A and 5B plotted on the same axes.

FIG. 5A illustrates the frequency response curve 27 for an unsharp filter, and FIG. 5B illustrates the frequency response curve 29 for the resulting sharpening operation. FIG. 6 shows the curves of FIGS. 5A and 5B plotted on the same axes. The effect of the sharpening factor, SF and the position of the center cutoff frequency f(0) of the digital filter is shown.

Figure 7:
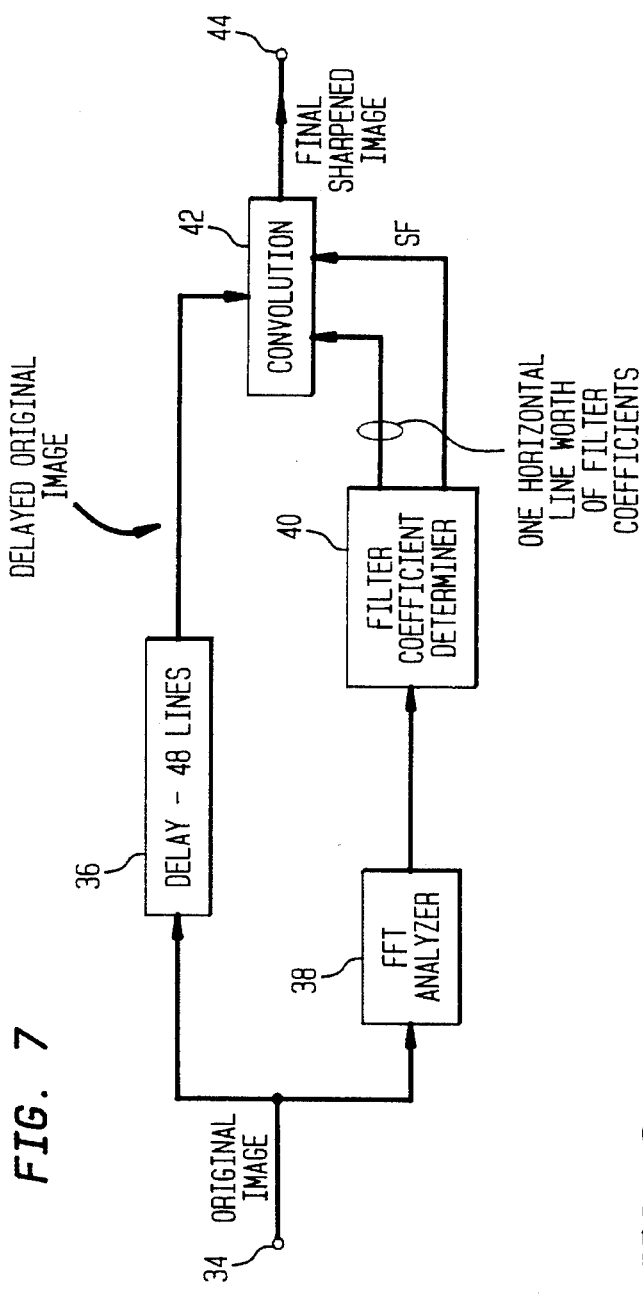
FIG. 7 is a block diagram of an adaptive image sharpening transfer function in accordance with the present invention.

The adaptive image sharpening transfer function in FIG. 7 comprises a fast Fourier transform analyzer 38 to determine the maximum frequency content FMAX, of the image signal on input terminal 34. The FFT could be calculated over the whole 128 by 128 pixel block (which is a fairly major computational overhead for the FFT) or could be for a smaller square in the center of the block.

Figure 3:
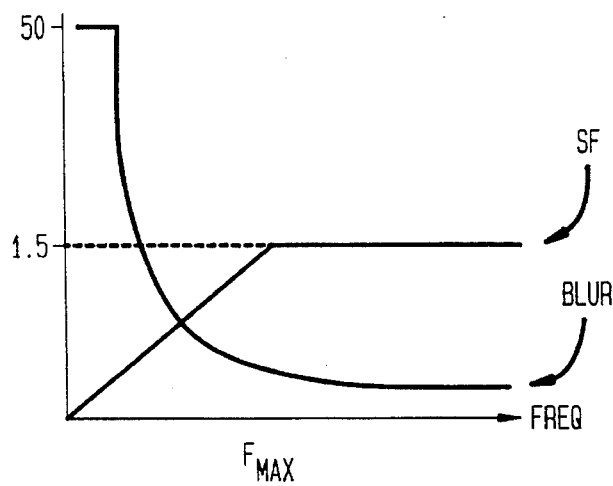
FIG. 3 is a graphical representation of the relationship of blur factor and SF to FMAX which is used in conjunction with the present invention.

The output of the FFT 38 is coupled to means 40 for determining the digital filter coefficients which control the amount of blur, as well as generate SF. FIG. 3 shows the relationship between the determination of FMAX and the setting of the sharpening parameters, SF and blur. (It is noted that a different technique may be used to calculate the FMAX for the blur, and the FMAX for the SF). In any event, for high values of FMAX, less blur is used. At lower values of FMAX the amount of blurring is increased up to some maximum value at very low FMAX, for very blurry images. The blur curve illustrated in FIG. 3 is inversely proportional to the square of FMAX. Also shown in FIG. 3, SF increases linearly from low values of FMAX up to a maximum constant value for moderately sharp to very sharp sub-area images. Thus, sub-area images which are already fairly sharp will not be over-sharpened, while blurry sub-area images will receive relatively more sharpening. Sub-area images containing no detail, however, will not be sharpened.

Figure 10:
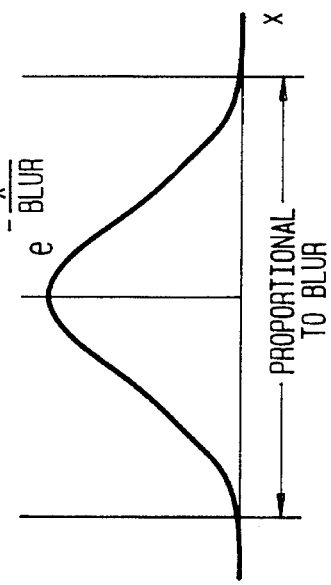
FIG. 10 is a Gaussian distribution curve representing the filter coefficients of the FIR digital filter embodied in the image sharpening apparatus of FIG. 8.

Returning to FIG. 7, the filter coefficient generator 40 provides sharpening parameters, SF and a set of filter coefficients, which will determine blur for each block of 128 horizontal pixels, to the convolution filter 42. (An embodiment of the convolution filter 42 is discussed below in conjunction with FIG. 8). A good function to use in the digital FIR filter of the convolution filter 42 is the familiar Gaussian bell curve shown in FIG. 10. It should be noted that the width of curve 10 is proportional to blur. The convolution filter 42 also receives a delayed version of the original signal from delay 36. The delay 36 is needed to allow for the FFT calculation time and subsequent determination of SF and the FIR filter coefficients. The delay 36 may be implemented by reading the image from a disk storage twice, or by using RAM memory to temporarily store the sub-area image. The output of the convolution filer 42 is a final sharpened image on output terminal 44.

In operation, an original image, or sub-area image is input at terminal 34. The FFT analyzer 38 and filter coefficient generator 40 compute the sharpening parameters, SF and FIR filter coefficients. The original image, delayed by delay element 36 is also input to the convolution filter 42 which uses the computed sharpening parameters to process the image into a final sharpened image on output terminal 44.

FIG. 8 is a block diagram illustrating image sharpening. The input image signal on terminal 34 is delayed in delay elements 46A, 46B, 46C, and 46D. A digital FIR filter includes multipliers 48A, 48B, 48C and 48D, the output of which is summed in adders 50A, 50B and 50C. There is one delay element and one multiplier for each filter coefficient, $F(-n)$ to $F(+n)$, with $F(0)$ being at the center position of the FIR filter. The number of adders (50A, 50B, and 50C) is one less than the number of filter coefficients. It should be noted that, although this technique suggests a blurring in one dimension only, a similar technique is used to blur in both dimensions. For example, the blur operation could consist of two convolutions, one to blur in the horizontal direction, one in the vertical direction The output of the FIR filter which is the output of adder 50C is the blurred (unsharp) image. The blurred image is then subtracted from the original image in adder 52. The difference image at the output adder 52 may be used directly in main sharpening formula (equation 1), or processed by a non-linear function f(x), in function generator 54 (equation 2). The non-linear function f(x) is illustrated in FIG. 9.

Figure 9:
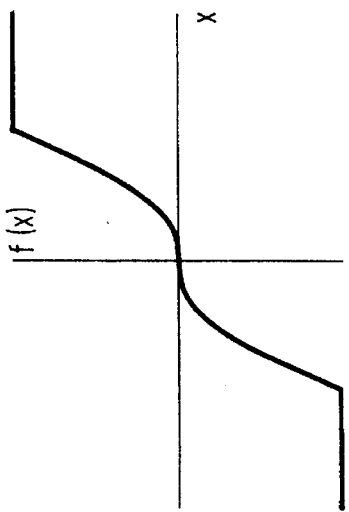
FIG. 9 is an illustration of a non-linear curve for use with the image sharpening apparatus of FIG. 8.

The modified difference image at the output of function generator 54 is scaled by the sharpening factor SF in multiplier 58. The final sharpened image is produced at the output of adder 56 which combines the original input image with the modified scaled difference image from multiplier 58 to produce the sharpened output image at terminal 44. The foregoing sharpening process, which is repeated for each sub-area of the original image to produce a sharpened final image can be expressed by the following formula (equation 2).

$$final = original + SF*f(x)*(original - unsharp),$$

where unsharp is the blurred image produced by the digital FIR filtering in FIG. 8, with coefficients determined from the FFT of the original image, SF is the sharpening factor determined from the FFT of the original image, and f(x) is an optional non-linear function shown in FIG. 9. A linear function may also be used.

For color photographs, individual color planes may be individually adaptively sharpened, or alternatively, a single composite luminance plane for the color image may be adaptively sharpened.

What is claimed is:

1. In a method for sharpening an image, said method comprising dividing the area of said image into a plurality of sub-area images and sharpening each of said sub-area images individually, wherein said step of sharpening each of said sub-area images includes means responsive to at least a portion of said sub-area image for determining at least one parameter for sharpening said sub-area image, an improved method for sharpening said sub-area image, wherein the improvement comprises:

scanning a plurality of input points of an original of said image for reading input image data corresponding to the input pixels of each said sub-area image to be sharpened;

determining the maximum frequency energy content of a portion of said sub-area image by Fourier transform analysis; and selecting a sharpening factor based on said determined maximum frequency energy content of said portion of said sub-area image.

2. A method in accordance with claim 1, wherein said step of sharpening each of said sub-area images further comprises:

generating a blurry sub-area image from said sub-area image;

subtracting said blurry sub-area image from said sub-area image to create a difference sub-area image;

multiplying said difference sub-area image by said sharpening factor to provide a scaled difference sub-area image; and combining said scaled difference sub-area image with said sub-area image.

3. A method in accordance with claim 2, wherein said step of multiplying said difference sub-area image by said sharpening factor includes applying a non-linear function to said difference sub-area image.

4. In a method for sharpening an image, said method comprising dividing the area of said image into a plurality of sub-area images and sharpening each of said sub-area images individually, wherein said step of sharpening each of said sub-area images includes means responsive to at least a portion of said sub-area image for determining at least one parameter for sharpening said sub-area image, an improved method for sharpening said sub-area image, wherein the improvement comprises:

scanning a plurality of input points of an original of said image for reading input image data corresponding to the input pixels of each said sub-area image to be sharpened;

determining the maximum frequency energy content of a portion of said sub-area image by Fourier transform analysis;

generating a blurry sub-area image from said sub-area image based on said determined maximum frequency energy content of said portion of said sub-area image; and subtracting said blurry sub-area image from said sub-area image to create a difference sub-area image, wherein said step of sharpening each of said sub-area images further comprises:

selecting a sharpening factor based on said determined maximum frequency energy content of said portion of said sub-area image;

multiplying said difference sub-area image by said sharpening factor to provide a scaled difference sub-area image; and combining said scaled difference sub-area image with said sub-area image.

5. A method in accordance with claim 4, wherein said step of multiplying said difference sub-area image by said sharpening factor includes applying a non-linear function to said difference sub-area image.

6. In a method for sharpening an image, said method comprising dividing the area of said image into a plurality of sub-area images and sharpening each of said sub-area images individually, wherein said step of sharpening each of said sub-area images includes means responsive to at least a portion of said sub-area image for determining at least one parameter for sharpening said sub-area image, an improved method for sharpening said sub-area image, wherein the improvement comprises:

scanning a plurality of input points of an original of said image for reading input image data corresponding to the input pixels of each said sub-area image to be sharpened;

determining the maximum frequency energy content of a portion of said sub-area image by Fourier transform analysis; and increasing the energy content of said sub-area image for frequencies substantially between said determined maximum frequency energy content and one half said determined maximum frequency energy content relative to the energy content of said sub-area image below one half said determined maximum frequency energy content.

7. In an apparatus for sharpening an image, said apparatus comprising means for dividing the area of said image into a plurality of sub-area images and means for sharpening each of said sub-area images individually, wherein said means for sharpening each of said sub-area images includes means responsive to at least a portion of said sub-area image for determining at least one parameter for sharpening said sub-area image, an improved apparatus for sharpening said sub-area image, wherein the improvement comprises:

means for scanning a plurality of input points of an original of said image for reading input image data corresponding to the input pixels of each said sub-area image to be sharpened;

means for determining the maximum frequency energy content of a portion of said sub-area image by Fourier transform analysis; and means for selecting a sharpening factor based on said determined maximum frequency energy content of said portion of said sub-area image.

8. An apparatus in accordance with claim 7, wherein said means for sharpening each of said sub-area images further comprises:

means for generating a blurry sub-area image from said sub-area image;

means for subtracting said blurry sub-area image from said sub-area image to create a difference sub-area image;

means for multiplying said difference sub-area image by said sharpening factor to provide a scaled difference sub-area image; and means for combining said scaled difference sub-area image with said sub-area image.

9. An apparatus in accordance with claim 8, wherein said means for multiplying said difference sub-area image by said sharpening factor includes means for applying a non-linear function to said difference sub-area image.

10. In an apparatus for sharpening an image, said apparatus comprising means for dividing the area of said image into a plurality of sub-area images and means for sharpening each of said sub-area images individually, wherein said means for sharpening each of said sub-area images includes means responsive to at least a portion of said sub-area image for determining at least one parameter for sharpening said sub-area image, an improved apparatus for sharpening said sub-area image, wherein the improvement comprises:

- means for scanning a plurality of input points of an original of said image for reading input image data corresponding to the input pixels of each said sub-area image to be sharpened;
- means for determining the maximum frequency energy content of a portion of said sub-area image by Fourier transform analysis; and
- means for generating a blurry sub-area image from said sub-area image based on said determined maximum frequency energy content of said portion of said sub-area image; and
- means for subtracting said blurry sub-area image from said sub-area image to create a difference sub-area image, wherein said means for sharpening each of said sub-area images further comprises:

- means for selecting a sharpening factor based on said determined maximum frequency energy content of said portion of said sub-area image;
- means for multiplying said difference sub-area image by said sharpening factor to provide a scaled difference sub-area image; and
- means for combining said scaled difference sub-area image with said sub-area image.

11. An apparatus in accordance with claim 10, wherein said means for multiplying said difference sub-area image by said sharpening factor includes means for applying a non-linear function to said difference sub-area image.

12. In an apparatus for sharpening an image, said apparatus comprising means for dividing the area of said image into a plurality of sub-area images and means for sharpening each of said sub-area images individually, wherein said means for sharpening each of said sub-area images includes means responsive to at least a portion of said sub-area image for determining at least one parameter for sharpening said sub-area image, an improved apparatus for sharpening said sub-area image, wherein the improvement comprises:

- means for scanning a plurality of input points of an original of said image for reading input image data corresponding to the input pixels of each said sub-area image to be sharpened;
- means for determining the maximum frequency energy content of a portion of said sub-area image by Fourier transform analysis; and
- means for increasing the energy content of said sub-area image for frequencies substantially between said determined maximum frequency energy content and one half said determined maximum frequency energy content relative to the energy content of said sub-area image below one half said determined maximum frequency energy content.

* * * * *